US011820893B2

(12) United States Patent
Ki et al.

(10) Patent No.: US 11,820,893 B2
(45) Date of Patent: Nov. 21, 2023

(54) POLYMER FILM AND PREPARATION METHOD THEREOF

(71) Applicant: SK microworks Co., Ltd., Gyeonggi-do (KR)

(72) Inventors: Jung Hee Ki, Gyeonggi-do (KR); Sunhwan Kim, Incheon (KR); Han Jun Kim, Gyeonggi-do (KR); Dae Seong Oh, Seoul (KR); Jin Woo Lee, Seoul (KR); Sang Hun Choi, Seoul (KR); Gun Uk Kim, Gyeonggi-do (KR)

(73) Assignee: SK Microworks Co., LTD., Gyeonggi-do (KR)

( * ) Notice: Subject to any disclaimer, the term of this patent is extended or adjusted under 35 U.S.C. 154(b) by 452 days.

(21) Appl. No.: 16/913,051

(22) Filed: Jun. 26, 2020

(65) Prior Publication Data

US 2020/0407556 A1 Dec. 31, 2020

(30) Foreign Application Priority Data

Jun. 28, 2019 (KR) .................. 10-2019-0078286
Dec. 11, 2019 (KR) .................. 10-2019-0164669
Mar. 20, 2020 (KR) .................. 10-2020-0034584

(51) Int. Cl.
*C08L 79/08* (2006.01)
*C08G 69/46* (2006.01)
*C08G 73/10* (2006.01)
*B29C 48/08* (2019.01)
*B29C 48/00* (2019.01)
*B29C 55/02* (2006.01)
*B29K 79/00* (2006.01)
*B29K 77/00* (2006.01)

(52) U.S. Cl.
CPC .......... *C08L 79/08* (2013.01); *B29C 48/0018* (2019.02); *B29C 48/08* (2019.02); *B29C 55/026* (2013.01); *C08G 69/46* (2013.01); *C08G 73/1028* (2013.01); *B29K 2077/00* (2013.01); *B29K 2079/08* (2013.01); *C08L 2203/16* (2013.01)

(58) Field of Classification Search
CPC ....................................... C09L 79/08
See application file for complete search history.

(56) References Cited

U.S. PATENT DOCUMENTS

2009/0231518 A1  9/2009  Sekiguchi et al.
2011/0245455 A1* 10/2011 Jeong ..................... C08L 79/08
                                                    528/353

(Continued)

FOREIGN PATENT DOCUMENTS

KR  10-1831884 B1   2/2018
KR  10-1922169 B1  11/2018

(Continued)

*Primary Examiner* — Arrie L Reuther
(74) *Attorney, Agent, or Firm* — IP & T GROUP LLP

(57) ABSTRACT

Embodiments relate to a polymer film that is excellent in folding characteristics and transparency and maintains excellent mechanical properties even after repeated elongation and shrinkage in the elastic region, a process for preparing the same, and a front panel and a display device comprising the same. The polymer film comprises a polymer resin selected from the group consisting of a polyamide-based resin and a polyimide-based resin and has an $MOR_{0/9}$ of Equation A of 2% or less.

8 Claims, 3 Drawing Sheets

(56) References Cited

U.S. PATENT DOCUMENTS

2012/0296050 A1* 11/2012 Cho .................. C09J 179/08
264/165
2019/0359784 A1 11/2019 Jeong et al.

FOREIGN PATENT DOCUMENTS

| KR | 10-2019-0092696 A | 8/2019 |
|---|---|---|
| TW | 200634354 A | 10/2006 |
| TW | 201833186 A | 9/2018 |

* cited by examiner

US 11,820,893 B2

POLYMER FILM AND PREPARATION METHOD THEREOF

The present application claims priority of Korean patent application numbers 10-2019-0078286 filed on Jun. 28, 2019, 10-2019-0164669 filed on Dec. 11, 2019 and 10-2020-0034584 filed on Mar. 20, 2020. The disclosure of each of the foregoing applications is incorporated herein by reference in its entirety.

TECHNICAL FIELD

Embodiments relate to a polymer film that is excellent in folding characteristics and transparency and maintains excellent mechanical properties even after repeated elongation and shrinkage in the elastic region, a polymer film that is little deformed when a certain level of load is continuously applied and is excellent in folding characteristics and transparency, and a process for preparing the same.

BACKGROUND ART OF THE INVENTION

Polyimide-based resins are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyimide is used in various fields. For example, polyimide is made in the form of a powder and used as a coating for a metal or a magnetic wire. It is mixed with other additives depending on the applications thereof. In addition, polyimide is used together with a fluoropolymer as a painter for decoration and corrosion prevention. It also plays a role of bonding a fluoropolymer to a metal substrate. In addition, polyimide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyimide has been developed in the form of a film, which is less expensive and has excellent optical, mechanical, and thermal characteristics. Such a polyimide-based film may be applied to display materials for organic light-emitting diodes (OLEDs) or liquid crystal displays (LCDs), and the like, and to antireflection films, compensation films, and retardation films if retardation properties are implemented.

When such a polyimide-based film is applied to a foldable display, a flexible display, and the like, there arises a problem that the mechanical properties are deteriorated as the folding or elongation/shrinking of the film is repeated. In order to solve this problem, additives are introduced, in which case the optical properties or compatibility may be impaired.

In addition, when a certain level of load is continuously applied to such a polyimide-based film, it is deformed. Thus, there arises a problem that when the film is applied to a display device or the like, it cannot show a uniform screen state. In particular, when the film is in a folded state, a tensile load may be continuously applied to the film. It may aggravate the problem that the screen is distorted when the film is applied to a foldable display.

Accordingly, there has been a continuous demand for research on the development of a film that maintains mechanical properties at least at a certain level even after repeated folding or elongation/shrinkage and a film that is little deformed and secures the mechanical properties and optical properties at least at a certain level when a load is continuously applied.

DISCLOSURE OF THE INVENTION

Problem to be Solved

Embodiments aim to provide a polymer film that is excellent in folding characteristics and transparency and maintains excellent mechanical properties even after repeated elongation and shrinkage in the elastic region, a polymer film that is little deformed when a certain level of load is continuously applied and is excellent in folding characteristics and transparency, and a process for preparing the same.

Solution to the Problem

The polymer film for a display according to an embodiment comprises a polymer resin selected from the group consisting of a polyamide-based resin and a polyimide-based resin and has an $MOR_{0/9}$ of the following Equation A of 2% or less.

$$MOR_{0/9}(\%) = \frac{|MO0 - MO9|}{MO9} \times 100 \quad \text{[Equation A]}$$

In Equation A, MO0 refers to the initial modulus, and MO9 refers to the modulus measured after elongation and shrinkage are repeated 9 times wherein each elongation is 2%.

The polymer film for a display according to another embodiment comprises a polymer resin selected from the group consisting of a polyamide-based resin and a polyimide-based resin and has an $S_1$ of the following Equation (1) of 40% or less, an $S_2$ of the following Equation (2) of 55% or less, and an $S_3$ of the following Equation (3) of 80% or less.

$$S_1(\%) = (L_1\% - 1\%) \times 100 \quad \text{[Equation (1)]}$$

$$S_2(\%) = \{(L_2\% - 2\%)/2\} \times 100 \quad \text{[Equation (2)]}$$

$$S_3(\%) = \{(L_3\% - 3\%)/3\} \times 100 \quad \text{[Equation (3)]}$$

In Equations (1) to (3),
when the film is elongated, and when the load at the time the length is increased by 1% relative to the initial length is $W_1$, the load at the time the length is increased by 2% is $W_2$, and the load at the time the length is increased by 3% is $W_3$,
the ratio of the increased length to the initial length is $L_1\%$ when the load $W_1$ is applied for 1 hour in the longitudinal direction of the film,
the ratio of the increased length to the initial length is $L_2\%$ when the load $W_2$ is applied for 1 hour in the longitudinal direction of the film, and
the ratio of the increased length to the initial length is $L_3\%$ when the load $W_3$ is applied for 1 hour in the longitudinal direction of the film.

The process for preparing a polymer film according to an embodiment comprises preparing a solution comprising a polymer resin selected from the group consisting of a polyamide-based resin and a polyimide-based resin in an organic solvent; charging the solution comprising the polymer resin into a tank; extruding and casting the polymer solution in the tank and then drying it to prepare a gel sheet; and thermally treating the gel sheet, wherein the highest temperature in the thermal treatment of the gel sheet is 300° C. or higher.

The process for preparing a polymer film according to another embodiment comprises preparing a solution comprising a polymer resin selected from the group consisting of a polyamide-based resin and a polyimide-based resin in an organic solvent; charging the solution comprising the polymer resin into a tank; casting the polymer solution in the tank onto a belt and then drying it to prepare a gel-sheet; thermally treating the gel-sheet while it is moved to prepare a cured film; cooling the cured film while it is moved; and winding the cooled cured film using a winder.

Advantageous Effects of the Invention

The polymer film according to an embodiment not only has excellent mechanical properties and optical properties but also can maintain excellent mechanical properties even after repeated elongation and shrinking several times by comprehensively adjusting the content of residual solvent, thermal treatment conditions, drying conditions, and the like.

The polymer film according to another embodiment is hardly deformed when a certain level of load is continuously applied for a long period of time, so that it is possible to prevent deformation by external impacts. Thus, when applied to a display device, it can provide a uniform screen state.

Further, the polymer film according to an embodiment achieves excellent folding characteristics, so that it can be advantageously applied to a cover window for a display device and a foldable display device or a flexible displace device.

Further, the polymer film is excellent in such mechanical properties as modulus, tensile strength, and elongation and such optical properties as yellow index and transmittance.

DETAILED DESCRIPTION FOR CARRYING OUT THE INVENTION

Figure 1:
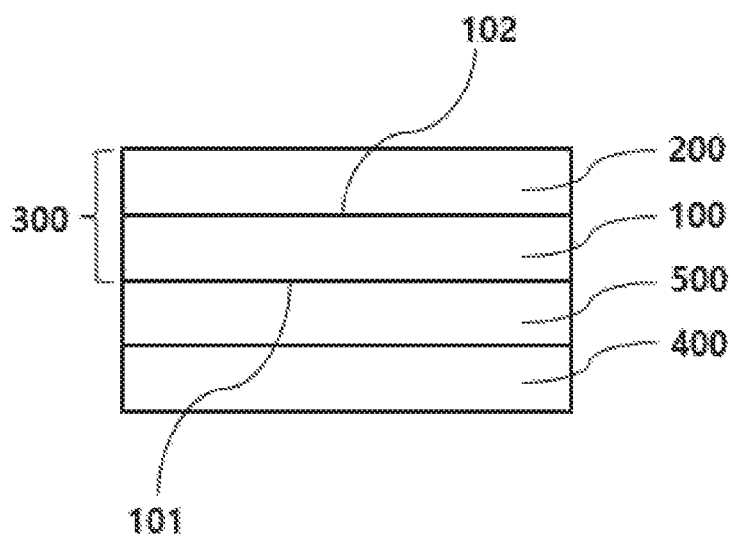
FIG. 1 is a cross-sectional view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expression related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polymer Film

Embodiments provide a polymer film that is excellent in folding characteristics and transparency and maintains excellent mechanical properties even after repeated elongation and shrinkage in the elastic region.

The polymer film according to an embodiment comprises a polymer resin.

The polymer film has an $MOR_{0/9}$ according to the following Equation A of 2% or less:

$$MOR_{0/9}(\%) = \frac{|MO0 - MO9|}{MO9} \times 100 \qquad [\text{Equation A}]$$

In Equation A, MO0 refers to the initial modulus, and MO9 refers to the modulus measured after elongation and shrinkage are repeated 9 times wherein each elongation is 2%.

Specifically, the $MOR_{0/9}$ may be 1.8% or less, 1.6% or less, 1.5% or less, 1.3% or less, 1.2% or less, 1.1% or less, or 1.05% or less, and 0.1% or more, or 0.2% or more, but it is not limited thereto.

The polymer film according to an embodiment has an MORw according to the above Equation A that satisfies the above range, so that the change in modulus is small even after repeated elongation and shrinkage. Since the film has excellent durability and almost no deformation of mechanical properties, it can be advantageously applied to a cover window and a display device.

In particular, since the change in modulus is small even after repeated elongation and shrinkage, it is suitable for application to a foldable display or a flexible display, which has recently been in the spotlight.

On the other hand, if the $MOR_{0/9}$ value according to the above Equation A is outside the above range, when the film is applied to a cover window for a display device, it is not balanced with other films or layers, resulting in an interlayer separation or cracks. Thus, the appearance of the film may be deteriorated, which makes it unsuitable for application to a display device in which the film is repeatedly deformed.

In the repetition of elongation and shrinkage, the region where the elongation is 2% refers to the elastic region of the film. The range of the elastic region increases as the material can store more energy before the film is plasticized. That is, the larger the range of the elastic region, the greater the resistance to plasticization and impact breakage, which indicates that the material is well restored after deformation.

The range of elongation and shrinkage can be appropriately adjusted depending on the range of the elastic region of the film. For example, elongation and shrinkage may be repeated until each elongation is 3%. Elongation and shrinkage may be repeated until each elongation is 2.5%. Elongation and shrinkage may be repeated until each elongation is 2%.

In the film according to an embodiment, the modulus was measured while elongation and shrinkage are repeated until each elongation is 2%. Here, the region at which the elongation is 2% refers to the elastic region, that is, a region capable of shrinking again without breakage of the film.

A sample is cut out by at least 10 cm in the MD direction and by 10 cm in the TD direction, which is fixed by the clips disposed at intervals of 10 cm in a universal testing machine UTM 5566A of Instron. A stress-strain curve is obtained until the elongation is 2% while it is stretched at a rate of 12.5 mm/min at room temperature. Modulus is measured from the slope of the load with respect to the initial strain.

The polymer film has a $dMO_{0/9}$ represented by the following Equation B of 0.18 GPa or less.

$$dMO_{0/9}(GPa) = |MO0 - MO9| \quad \text{[Equation B]}$$

In Equation B, MO0 refers to the initial modulus, and MO9 refers to the modulus measured after elongation and shrinkage are repeated 9 times wherein each elongation is 2%.

Specifically, the $dMO_{0/9}$ of the polymer film may be 0.16 GPa or less, 0.15 GPa or less, 0.13 GPa or less, 0.12 GPa or less, 0.10 GPa or less, or 0.08 GPa or less, and 0.01 GPa or more, but it is not limited thereto.

The polymer film according to an embodiment has a $dMO_{0/9}$ according to the above Equation B that satisfies the above range, so that the durability is excellent even after repeated elongation and shrinkage. Thus, it can be advantageously applied to a cover window and a display device, in particular, to a foldable display device or flexible display device.

In the polymer film, when the initial modulus is MO0, and the modulus measured after elongation and shrinkage are repeated n times wherein each elongation is 2% is MOn, the standard deviation in modulus calculated based on a total of 10 values, MO0 to MO9, is 0.06 GPa or less.

Specifically, the standard deviation in modulus of the polymer film may be 0.05 GPa or less, 0.04 GPa or less, or 0.03 GPa or less, and 0.01 GPa or more or 0.02 GPa or more, but it is not limited thereto.

As to the measurement of the standard deviation in modulus, specifically, the initial modulus is MO0, the modulus measured after one time of elongation/shrinkage is MO1, the modulus measured after two times of elongation/shrinkage is MO2, the modulus measured after three times of elongation/shrinkage is MO3, the modulus measured after four times of elongation/shrinkage is MO4, the modulus measured after five times of elongation/shrinkage is MO5, the modulus measured after six times of elongation/shrinkage is MO6, the modulus measured after seven times of elongation/shrinkage is MO7, the modulus measured after eight times of elongation/shrinkage is MO8, and the modulus measured after nine times of elongation/shrinkage is MO9. The standard deviation in modulus is calculated based on a total of 10 values, MO0, MO1, MO2, MO3, MO4, MO5, MO6, MO7, MO8, and MO9.

If the standard deviation in modulus of the polymer film satisfies the above range, the change in modulus even after repeated elongation/shrinkage is small, indicating that the modulus values are uniform and that the modulus hardly decreases rapidly. Thus, it is suitable for application to a display device in which the mechanical properties must be maintained at least at a certain level even if the film is continuously deformed.

The polymer film has an initial modulus (MO0) of 5.0 GPa or more.

Specifically, the initial modulus (MO0) of the polymer film may be 5.5 GPa or more, 5.8 GPa or more, 6.0 GPa or more, or 6.5 GPa or more, and 20 GPa or less, or 15 GPa or less, but it is not limited thereto.

The polymer film has a modulus (MO9) of 5 GPa or more when measured after elongation and shrinkage are repeated 9 times wherein each elongation is 2%.

Specifically, the modulus (MO9) of the polymer film measured after elongation and shrinkage are repeated 9 times wherein each elongation is 2% may be 5.5 GPa or more, 5.8 GPa or more, 6.0 GPa or more, or 6.5 GPa or more, and 20 GPa or less, or 15 GPa or less, but it is not limited thereto.

The content of the residual solvent in the polymer film is 2,000 ppm or less. For example, the content of the residual solvent may be 1,800 ppm or less, 1,500 ppm or less, 1,400 ppm or less, 1,300 ppm or less, 1,200 ppm or less, 1,000 ppm or less, 800 ppm or less, or 500 ppm or less, and 100 ppm or more, 200 ppm or more, 300 ppm or more, or 500 ppm or more, but it is not limited thereto.

The residual solvent refers to the amount of solvents that are not volatilized during the film production and remains in the film finally produced.

If the content of the residual solvent in the polymer film exceeds the above range, the modulus after repeated elongation and shrinkage in the elastic region is significantly deteriorated, which impairs the durability of the film and which, in particular, may have an impact on the subsequent processing of the film. Specifically, if the content of the residual solvent exceeds the above range, the hydrolysis of the film is expedited, resulting in a deterioration in the mechanical properties or the optical properties.

The polymer film has an IRS represented by the following Equation C of 100 or less.

$$IRS = \frac{IM}{1 \text{ mol}} \times \frac{RS}{20 \text{ ppm}} \quad \text{[Equation C]}$$

In Equation C, IM stands for the number of moles of the imide-based repeat unit when the total number of moles of the imide-based repeat unit and the amide-based repeat unit in the film is 100; and RS stands for the content (ppm) of the residual solvent in the film.

Specifically, the IRS value of the polymer film may be 10 to 100, 20 to 100, 10 to 95, 10 to 92, 20 to 95, 30 to 100, 30 to 95, 40 to 100, 40 to 95, but it is not limited thereto.

If the IRS value of the polymer film satisfies the above range, it is possible to obtain a film having excellent folding characteristics by virtue of its excellent durability even after elongation and shrinkage are repeated in the elastic region.

In particular, if the above range is exceeded since the imide content (IM) is high or the content of the residual solvent (RS) is high, the long-term durability of the film is rapidly deteriorated. Specifically, if the imide content is too high and the amide content is thus relatively reduced, or if the content of the residual solvent is high, the hygroscopicity of the film decreases, which rapidly reduces the modulus as elongation and shrinkage are repeated.

The polymer film has an MPA represented by the following Equation D of 2% or less.

$$MPA\ (\%) = MOR_{0/9}/AM \quad \text{[Equation D]}$$

In Equation D, AM stands for the number of moles of the amide-based repeat unit when the total number of moles of the imide-based repeat unit and the amide-based repeat unit in the film is 1.

Specifically, the MPA may be 1.8% or less, 1.6% or less, 1.5% or less, 1.3% or less, 1.2% or less, 1.1% or less, or 1.05% or less, and 0.1% or more, or 0.2% or more, but it is not limited thereto.

The polymer film according to an embodiment has an MPA according to the above Equation D that satisfies the above range, so that the change in modulus is small even after repeated elongation and shrinkage even though the content of the amide-based repeat unit in the polymer is high. Since the film has excellent durability and almost no deformation of mechanical properties, it can be advantageously applied to a cover window and a display device.

In particular, since the change in modulus is small relative to the content of amide even after repeated elongation/shrinkage, it is suitable for application to a foldable display or a flexible display, which has recently been in the spotlight.

The polymer film according to an embodiment increases the content of the amide-based repeat unit, thereby enhancing the mechanical properties. In such event, it is possible to prevent the deviation in mechanical properties after repeated elongation and shrinkage by comprehensively and appropriately adjusting the composition, additives, residual solvent, and preparation process. That is, since the value according to the above Equation D of the polymer film satisfies the above range, it is possible to prevent the deterioration of mechanical properties in the course of folding the polymer film while it has excellent mechanical properties.

When the polymer film according to an embodiment based on a thickness of 50 μm is folded to have a radius of curvature of 2 mm, the number of folding before the fracture is 100,000 or more, 150,000 or more, or 200,000 or more.

The number of folding counts one when the film is folded to have a radius of curvature of 2 mm and then unfolded.

Further, the polymer film according to an embodiment, which satisfies the above number of folding, has excellent folding characteristics when applied to a display device, so that it can be advantageously applied to a foldable display device or a flexible displace device.

Another embodiment provides a polymer film that is little deformed when a certain level of load is continuously applied and is excellent in folding characteristics and transparency.

The polymer film has an $S_1$ of the following Equation (1) of 40% or less.

$$S_1(\%) = (L_1\% - 1\%) \times 100 \quad \text{[Equation (1)]}$$

In Equation (1), when the film is elongated, and when the load at the time the length is increased by 1% relative to the initial length is $W_1$, the ratio of the increased length to the initial length is $L_1\%$ when the load $W_1$ is applied for 1 hour in the longitudinal direction of the film.

Specifically, the polymer film may have an $S_1$ of 0% to 40%, 5% to 40%, 5% to 35%, 10% to 40%, 10% to 35%, 12% to 35%, or 12% to 32%, but it is not limited thereto.

If the $S_1$ is 5% or more, the polymer film may have a certain degree of flexibility and may achieve proper folding characteristics.

The polymer film has an $S_2$ of the following Equation (2) of 55% or less.

$$S_2(\%) = \{(L_2\% - 2\%)/2\} \times 100 \quad \text{[Equation (2)]}$$

In Equation (2), when the film is elongated, and when the load at the time the length is increased by 2% relative to the initial length is $W_2$, the ratio of the increased length to the initial length is $L_2\%$ when the load $W_2$ is applied for 1 hour in the longitudinal direction of the film.

Specifically, the polymer film may have an $S_2$ of 0% to 55%, 5% to 55%, 5% to 40%, 7% to 50%, 7% to 40%, 10% to 55%, 10% to 50%, 10% to 45%, 10% to 42%, 10% to 40%, 15% to 45%, 15.5% to 45%, 15% to 42%, or 15.5% to 41%, but it is not limited thereto.

If the $S_2$ is 5% or more, the polymer film may have a certain degree of flexibility and may achieve proper folding characteristics.

The polymer film has an $S_3$ of the following Equation (3) of 80% or less.

$$S_3(\%) = \{(L_3\% - 3\%)/3\} \times 100 \quad \text{[Equation (3)]}$$

In Equation (3), when the film is elongated, and when the load at the time the length is increased by 3% relative to the initial length is $W_3$, the ratio of the increased length to the initial length is $L_3\%$ when the load $W_3$ is applied for 1 hour in the longitudinal direction of the film.

Specifically, the polymer film may have an $S_3$ of 0% to 80%, 10% to 80%, 20% to 80%, 30% to 80%, 40% to 80%, 45% to 80%, 50% to 80%, 55% to 80%, 60% to 80%, 60% to 78%, or 62% to 78%, but it is not limited thereto.

If the $S_3$ is 10% or more, the polymer film may have a certain degree of flexibility and may achieve proper folding characteristics.

The $S_1$, $S_2$, and $S_3$ may be obtained for a film having a width of 15 mm and a length of 50 mm. Alternatively, the $S_1$, $S_2$, and $S_3$ may be obtained for a film having a width of 10 mm and a length of 50 mm. The $W_1$, $W_2$, $W_3$, $L_1$, $L_2$, and $L_3$ may be measured while the film of the above size is stretched at a tensile speed of 50 mm/min in the longitudinal direction. The $W_1$, $W_2$, $W_3$, $L_1$, $L_2$, and $L_3$ may be measured using a universal testing machine (UTM).

In addition, the $S_1$, $S_2$, and $S_3$ may be obtained for a film having a thickness of any one of about 20 μm to about 120 μm. The $W_1$, $W_2$, $W_3$, $L_1$, $L_2$, and $L_3$ may be measured while the film of the above size is stretched at a tensile speed of 50 mm/min in the longitudinal direction. The $W_1$, $W_2$, $W_3$, $L_1$, $L_2$, and $L_3$ may be measured using a universal testing machine (UTM). For example, the $S_1$, $S_2$, and $S_3$ may be obtained for a film having a thickness of 50 μm, but it is not limited thereto.

The conventional films are vulnerable to external presses and are deformed by external impacts. Thus, when applied to a display device, they do not show a uniform screen state, resulting in a problem that the screen is distorted.

The polymer film according to an embodiment has $S_1$, $S_2$, and $S_3$, that satisfy the above ranges, whereby it is possible to solve the problems of the conventional films and to maintain a uniform screen state by virtue of little deformation upon a long-term physical impact such as folding and bending in its structure when applied to a display device.

When the $S_1$, $S_2$, and $S_3$ of the polymer film are measured, the longitudinal direction of a sample film (e.g., a film having a width of 15 mm, a length of 50 mm, and a thickness of 50 μm, or a film having a width of 10 mm, a length of 50 mm, and a thickness of 50 μm) may be the MD direction (or machine direction) or TD direction (or tenter direction) of the film. Specifically, the "MD direction" refers to the direction in which the belt moves during the preparation of the film, and the "TD direction" refers to the direction perpendicular to the MD direction.

Specifically, the longitudinal direction of a sample film may be the MD direction, but it is not limited thereto.

The polymer film is stretched at a stretching ratio of 1.01 to 1.1 times in the MD direction. The polymer film may be stretched by 1.01 to 1.05 times in the MD direction.

If the stretching ratio in the MD direction of the polymer film according to an embodiment satisfies the above range, it is possible to obtain a film that is little deformed when a certain level of load is continuously applied, is excellent in durability against physical impacts, and is excellent in folding characteristics. Specifically, the stretching causes crystallization in the film through orientation, whereby it is possible to obtain a film that is excellent in deformation characteristics. On the other hand, if the stretching ratio in the MD direction of the polymer film according to an embodiment is without the above range, the flexural resistance of the film is particularly deteriorated, and it is difficult to achieve the desired physical properties.

The polymer film is stretched at a stretching ratio of 1.01 to 1.1 times in the TD direction. The polymer film may be stretched by 1.01 to 1.05 times in the TD direction.

If the stretching ratio in the TD direction of the polymer film according to an embodiment satisfies the above range, it is possible to obtain a film that is little deformed when a certain level of load is continuously applied, is excellent in durability against physical impacts, and is excellent in folding characteristics. Specifically, the stretching causes crystallization in the film through orientation, whereby it is possible to obtain a film that is excellent in deformation characteristics. On the other hand, if the stretching ratio in the TD direction of the polymer film according to an embodiment is without the above range, the flexural resistance of the film is particularly deteriorated, and it is difficult to achieve the desired physical properties.

The polymer resin may be selected from the group consisting of a polyamide-based resin and a polyimide-based resin.

The polyamide-based resin is a resin that contains an amide-based repeat unit. The polyimide-based resin is a resin that contains an imide-based repeat unit. In addition, a resin comprising the imide-based repeat unit and the amide-based repeat unit may be referred to as the polyamide-based resin and may be referred to as the polyimide-based resin.

For example, the polymer resin may be a resin comprising a polyamide-based resin, a resin comprising a polyimide-based resin, or a resin comprising both a polyamide-based resin and a polyimide-based resin.

Meanwhile, the polymer resin may be prepared by simultaneously or sequentially reacting reactants that comprise a diamine compound and a dianhydride compound. Specifically, the polymer resin may be prepared by polymerizing a diamine compound and a dianhydride compound.

Alternatively, the polymer resin may be prepared by polymerizing a diamine compound, a dianhydride compound, and a dicarbonyl compound. Here, the polymer resin may comprise an imide repeat unit derived from the polymerization of the diamine compound and the dianhydride compound and an amide repeat unit derived from the polymerization of the diamine compound and the dicarbonyl compound.

The polymer film according to an embodiment comprises a polymer resin selected from the group consisting of a polyamide-based resin and a polyimide-based resin, wherein the polymer resin is prepared by polymerizing a diamine compound, a dianhydride compound, and optionally a dicarbonyl compound.

The sum of a compound having the following moiety A and a compound having the following moiety B is 30% by mole to 90% by mole based on the total number of moles of the diamine compound, the dianhydride compound, and the dicarbonyl compound.

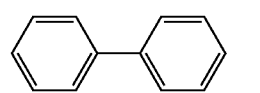

[Moiety A]

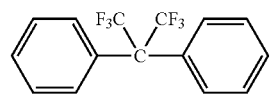

[Moiety B]

The compound having moiety A refers to a compound in which moiety A contains one or more substituents. In the case where moiety A contains two or more substituents, the two or more substituents may be combined with each other to form a ring.

Similarly, the compound having moiety B refers to a compound in which moiety B contains one or more substituents. In the case where moiety B contains two or more substituents, the two or more substituents may be combined with each other to form a ring.

Specifically, the polymer film comprises a polymer resin prepared by polymerizing a diamine compound, a dianhydride compound, and optionally a dicarbonyl compound, wherein the sum of a compound having the above moiety A and a compound having the following above B may be 30% by mole to 80% by mole, 30% by mole to 70% by mole, or 35% by mole to 70% by mole, based on the total number of moles of the diamine compound, the dianhydride compound, and the dicarbonyl compound, but it is not limited thereto.

If the content of the compound having moiety A and the compound having moiety B is less than the above range, the film thus prepared would be deformed at least at a certain level under a load, which is not suitable for application to a subsequent process. If the film is deformed at least at a certain level under a load, when the film is applied to a display device, a trace may appear on the film surface, so that a uniform screen may not be displayed and the screen may be distorted.

In addition, if the content of the compound having moiety A and the compound having moiety B exceeds the above range, the film has deteriorated physical properties in terms of folding characteristics. Thus, it is unsuitable for application to a foldable display, a flexible display, a rollable display, and the like.

The polymer film according to an embodiment comprises a polymer resin, wherein the polymer resin is prepared by polymerizing a diamine compound, a dianhydride compound, and optionally a dicarbonyl compound, and the molar ratio of the dianhydride compound and the dicarbonyl compound is 15:85 to 100:0 or 0:100 to 50:50.

In another embodiment, the molar ratio of the dianhydride compound and the dicarbonyl compound may be 15:85 to 85:15, 15:85 to 80:20, 15:85 to 75:25, 15:85 to 70:30, 15:85 to 60:40, 0:100 to 40:60, or 0:100 to 35:65, but it is not limited thereto.

If the molar ratio of the dianhydride compound and the dicarbonyl compound is within the above range, it is possible to obtain a transparent film that is hardly deformed when a certain level of load is continuously applied for a long period of time and is excellent in folding characteristics. In addition, it is possible to achieve excellent optical properties, mechanical properties, and durability despite a number of repeated folding and elongation/shrinkage of the film. For example, if the molar ratio of the dicarbonyl compound is relatively large, the mechanical strength such as modulus may be deteriorated.

Specifically, when the content of the compound having moiety A and the compound having moiety B and the molar ratio of the dianhydride compound and the dicarbonyl compound are both satisfied, it is possible to accomplish a technique for obtaining a film that has excellent flexural resistance and minimized deformation under a load.

As another embodiment, the dianhydride compound may be composed of one, two, or more types, and the dicarbonyl compound may be composed of zero, one, two, or more types.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

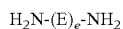 [Formula 1]

In Formula 1,
E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a, but it is not limited thereto.

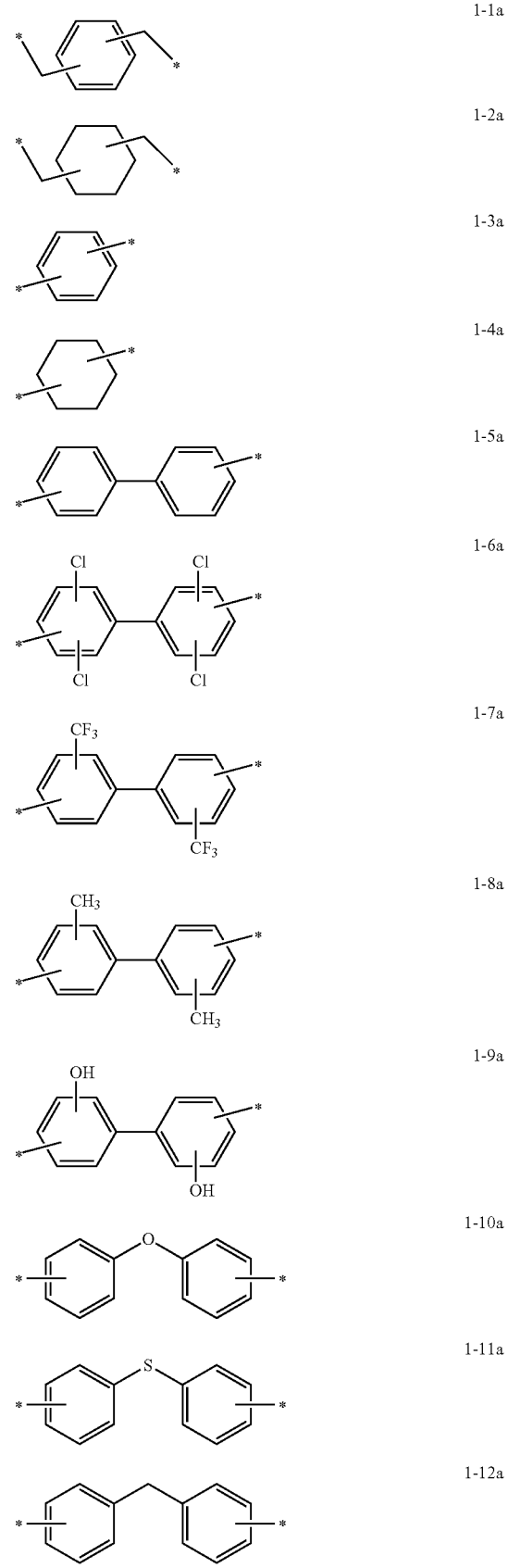

-continued

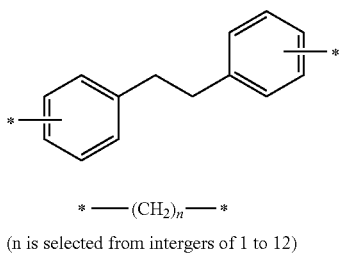

*—(CH₂)ₙ—*

(n is selected from intergers of 1 to 12)

Specifically, (E)ₑ in Formula 1 may be selected from the groups represented by the following Formulae 1-1b to 1-13b, but it is not limited thereto:

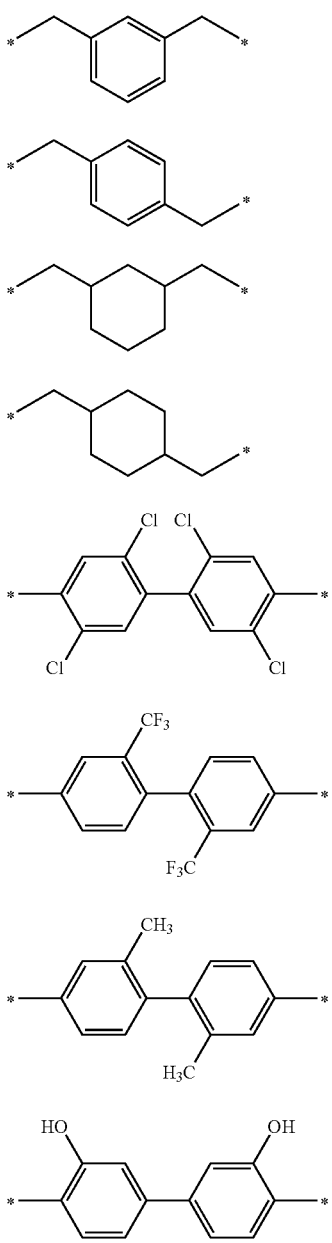

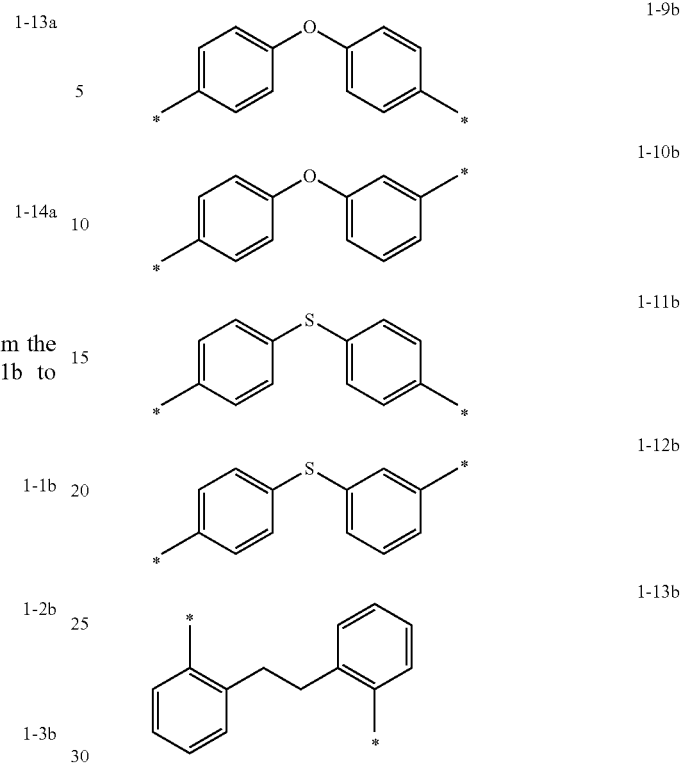

More specifically, (E)ₑ in Formula 1 may be the group represented by the above Formula 1-6b or the group represented by the above Formula 1-9b.

In an embodiment, the diamine compound may comprise a compound having a fluorine-containing substituent or a compound having an ether group (—O—). In such event, the fluorine-containing substituent may be a fluorinated hydrocarbon group and specifically may be a trifluoromethyl group. But it is not limited thereto.

In another embodiment, one or two kinds of diamine compounds may be used as the diamine compound.

For example, the diamine compound may comprise 2,2'-bis(trifluoromethyl)-4,4'-diaminobiphenyl (TFDB/TFMB) represented by the following formula, but it is not limited thereto.

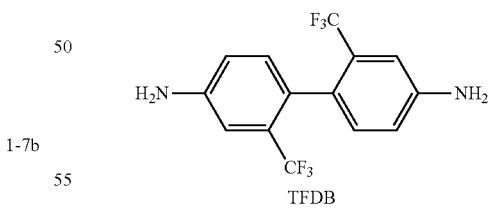

TFDB

Alternatively, the diamine compound may comprise TFMB and 4,4'-oxydianiline (ODA), but it is not limited thereto.

The dianhydride compound has a low birefringence value, so that it can contribute to enhancements in the optical properties such as transmittance of a film that comprises the polymer resin. The polyimide-based resin refers to a resin that contains an imide-based repeat unit.

The dianhydride compound is not particularly limited, but it may be, for example, an aromatic dianhydride compound that contains an aromatic structure or an alicyclic dianhydride compound that contains an alicyclic structure.

For example, the aromatic dianhydride compound may be a compound represented by the following Formula 2.

[Formula 2]

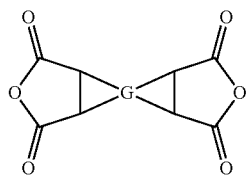

In Formula 2, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in Formula 2 may be selected from the groups represented by the following Formulae 2-1a to 2-9a, but it is not limited thereto.

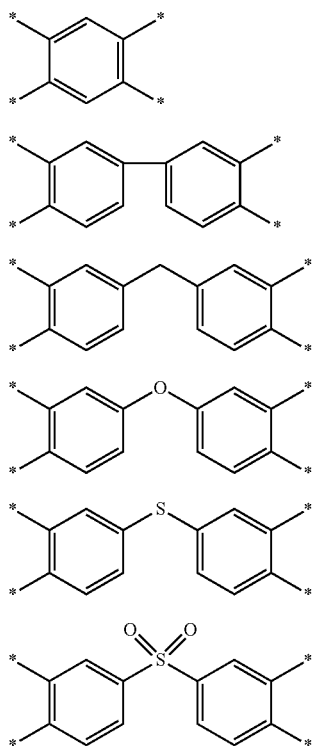

2-1a 2-2a 2-3a 2-4a 2-5a 2-6a

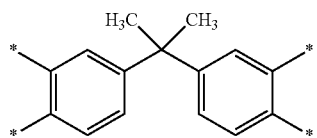

2-7a

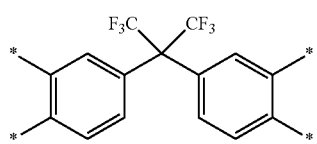

2-8a

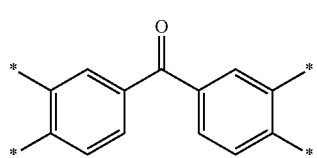

2-9a

For example, G in Formula 2 may be the group represented by the above Formula 2-2a, the group represented by the above Formula 2-8a, or the group represented by the above Formula 2-9a.

In addition, the alicyclic dianhydride compound may comprise a compound having a cyclobutane structure. Specifically, the alicyclic dianhydride compound may be cyclobutane-1,2,3,4-tetracarboxylic dianhydride (CBDA), but it not limited thereto.

In another embodiment, the dianhydride compound may comprise a compound having a fluorine-containing substituent, a compound having a biphenyl group, or a compound having a cyclobutane group. In such event, the fluorine-containing substituent may be a fluorinated hydrocarbon group and specifically may be a trifluoromethyl group. But it is not limited thereto.

In another embodiment, the dianhydride compound may be composed of a single component or a mixture of two or more components.

For example, the dianhydride compound may comprise 2,2'-bis-(3,4-dicarboxyphenyl)hexafluoropropane dianhydride (6FDA) represented by the following formula, but it is not limited thereto.

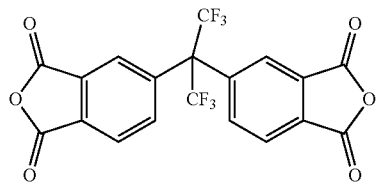

6-FDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

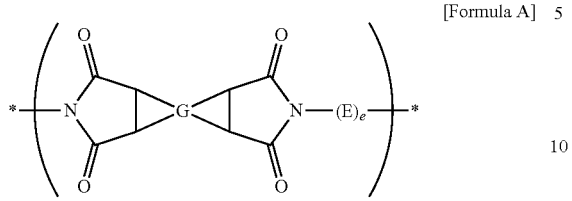
[Formula A]

In Formula A, E, G, and e are as described above.

For example, the polyimide may comprise a repeat unit represented by the following Formula A-1, but it is not limited thereto.

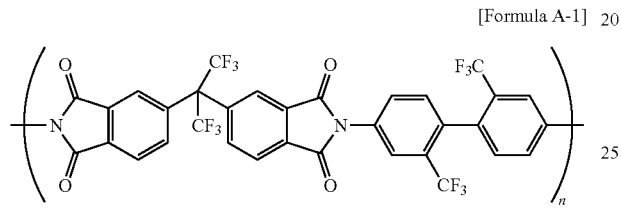
[Formula A-1]

In Formula A-1, n is an integer of 1 to 400.

The dicarbonyl compound is not particularly limited, but it may be, for example, a compound represented by the following Formula 3.

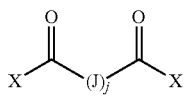
[Formula 3]

In Formula 3,

J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

(J)j in Formula 3 may be selected from the groups represented by the following Formulae 3-1a to 3-14a, but it is not limited thereto.

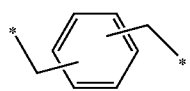
3-1a

3-2a

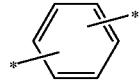
3-3a

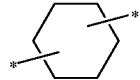
3-4a

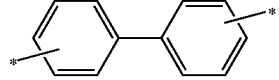
3-5a

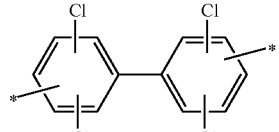
3-6a

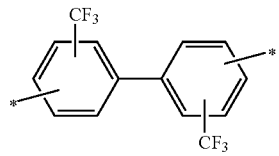
3-7a

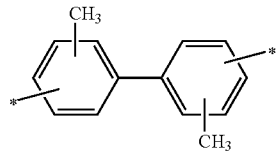
3-8a

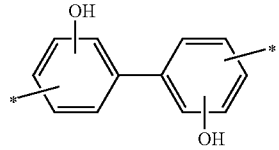
3-9a

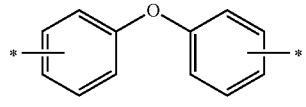
3-10a

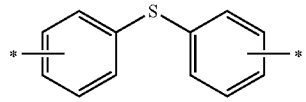
3-11a

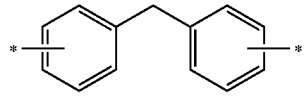
3-12a

-continued 3-13a
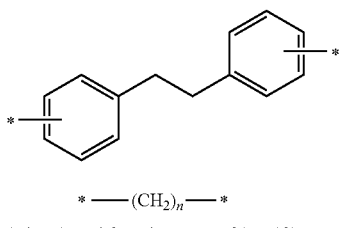

3-14a
* ——(CH$_2$)$_n$—— *

(n is selected from intergers of 1 to 12)

Specifically, (J)$_j$ in Formula 3 may be selected from the groups represented by the following Formulae 3-1b to 3-8b, but it is not limited thereto.

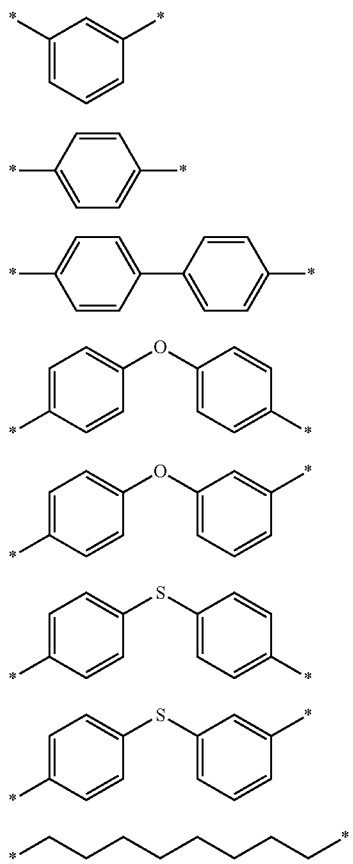

3-1b
3-2b
3-3b
3-4b
3-5b
3-6b
3-7b
3-8b

More specifically, (J) in Formula 3 may be the group represented by the above Formula 3-1b, the group represented by the above Formula 3-2b, the group represented by the above Formula 3-3b, or the group represented by the above Formula 3-8b.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

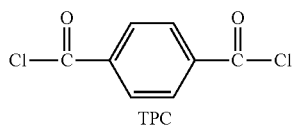
TPC

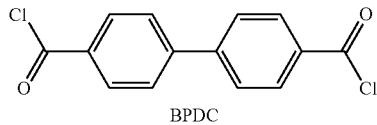
BPDC

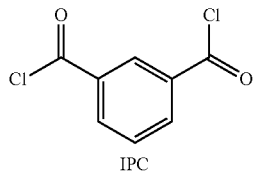
IPC

The diamine compound and the dicarbonyl compound may be polymerized to form a repeat unit represented by the following Formula B.

[Formula B]
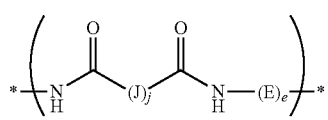

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

[Formula B-1]

In Formula B-2, y is an integer of 1 to 400.

[Formula B-2]

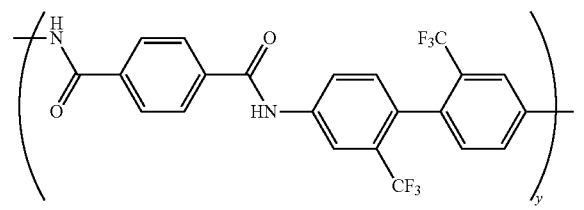

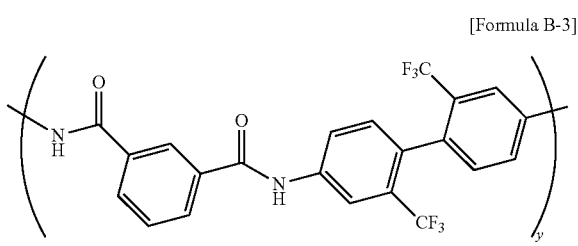

[Formula B-3]

In Formula B-3, y is an integer of 1 to 400.

According to an embodiment, the polymer resin may comprise an imide-based repeat unit and an amide-based repeat unit at a molar ratio of 0:100 to 50:50, 0:100 to 40:60, or 0:100 to 35:65, but it is not limited thereto.

If the molar ratio of the imide-based repeat unit and the amide-based repeat unit is within the above range, it is possible to obtain a film not only having excellent optical properties and mechanical properties but also can maintain excellent mechanical properties even after repeated elongation and shrinkage several times. On the other hand, if the molar ratio of the amide repeat unit exceeds the above range, the mechanical properties such as modulus may be deteriorated.

According to an embodiment, the polymer resin may comprise a repeat unit represented by the following Formula A and a repeat unit represented by the following Formula B:

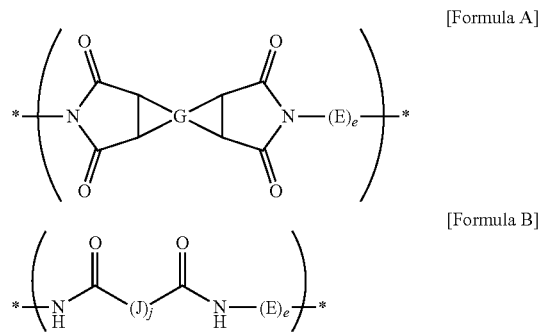

[Formula A]

[Formula B]

In Formulae A and B,

E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G may be bonded by a bonding group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone or may be bonded to each other to form a condensed ring, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

In the polymer resin, the molar ratio of the repeat unit represented by the above Formula A to the repeat unit represented by the above Formula B may be 0:100 to 50:50, 0:100 to 40:60, or 0:100 to 35:65, but it is not limited thereto.

Alternatively, the polymer resin may comprise the repeat unit represented by the following Formula A and the repeat unit represented by the following Formula B at a molar ratio of 15:85 to 100:0, 15:85 to 85:15, 15:85 to 80:20, 15:85 to 75:25, 15:85 to 70:30, or 15:85 to 60:40, but it is not limited thereto.

According to an embodiment, the polymer film may further comprise a filler.

The filler may be at least one selected from the group consisting of barium sulfate, silica, and calcium carbonate. As the polymer film comprises the filler, it is possible to enhance not only the roughness and winderability but also the effect of improving the scratches caused by sliding in the preparation of the film.

In addition, the filler may have a particle diameter of 0.01 μm to less than 1.0 μm. For example, the particle diameter of the filler may be 0.05 μm to 0.9 μm or 0.1 μm to 0.8 μm, but it is not limited thereto.

The polymer film may comprise the filler in an amount of 0.01 to 3% by weight based on the total weight of the polymer film.

The polymer film has a transmittance of 80% or more. For example, the transmittance may be 85% or more, 87% or more, 88% or more, or 89% or more, and 99% or less, 98% or less, or 97% or less, but it is not limited thereto.

The polymer film has a haze of 1.8% or less, 1.5% or less, or 1% or less. For example, the haze of the polymer film may be 0.8% or less, 0.6% or less, 0.5% or less, or 0.4% or less, but it is not limited thereto.

If the haze of the polymer film exceeds the above range, the transparency is deteriorated, making it unsuitable for application to a front panel or a display device. In addition, since the screen appears bluish and dark, there arises a problem that more power is consumed to maintain a brighter screen to compensate for this.

The polymer film has a yellow index of 3 or less. For example, the yellow index of the polymer film may be 2.9 or less, but it is not limited thereto.

The polymer film has a modulus of 5.0 GPa or more. Specifically, the modulus may be 5.5 GPa or more, 6.0 GPa or more, or 6.0 GPa to 8.0 GPa, but it is not limited thereto.

The polymer film has a compressive strength is 0.3 kgf/μm or more. Specifically, the compressive strength may be 0.4 kgf/μm or more, 0.45 kgf/μm or more, or 0.48 kgf/μm or more, but it is not limited thereto.

When the polymer film is perforated at a rate of 10 mm/min using a 2.5-mm available spherical tip in a UTM compression mode, the maximum diameter (mm) of perforation including a crack is 65 mm or less. Specifically, the maximum diameter of perforation may be 5 to 60 mm, 10 to 60 mm, 15 to 60 mm, 20 to 60 mm, 25 to 60 mm, or 25 to 58 mm, but it is not limited thereto.

The polymer film has a surface hardness of HB or higher. Specifically, the surface hardness may be H or higher, or 2H or higher, but it is not limited thereto.

The polymer film has a tensile strength of 14 kgf/mm² or more. Specifically, the tensile strength may be 16 kgf/mm² or more, 18 kgf/mm² or more, 20 kgf/mm² or more, 21 kgf/mm² or more, or 22 kgf/mm² or more, but it is not limited thereto.

The polymer film has an elongation of 13% or more. Specifically, the elongation may be 15% or more, 16% or more, 17% or more, or 17.5% or more, but it is not limited thereto.

The polymer film according to an embodiment is excellent in folding characteristics, maintains excellent mechanical properties even after repeated elongation and shrinkage in the elastic region, and has a clean appearance and transparency by virtue of high transmittance, low haze, and low yellow index. Thus, it can be advantageously applied to a foldable display device or a flexible displace device.

The polymer film according to an embodiment may secure excellent optical properties in terms of low haze and low yellow index (YI), as well as excellent folding characteristics and excellent mechanical properties at high temperatures and high humidity. Thus, it is possible to impart long-term stable mechanical properties to a substrate that requires flexibility in terms of modulus, elongation, tensile characteristics, and elastic restoring force.

The physical properties of the polymer film as described above are based on a thickness of 40 μm to 60 μm or a thickness of 70 μm to 90 μm. For example, the physical properties of the polymer film are based on a thickness of 50 μm or a thickness of 80 μm.

The features on the components and properties of the polymer film as described above may be combined with each other.

In addition, the properties of the polymer film as described above are the results materialized by combinations of the chemical and physical properties of the components, which constitute the polymer film, along with the conditions in each step of the process for preparing the polymer film as described below.

For example, the excellent physical properties of the polymer film according to an embodiment are achieved by combinations of the types and contents of the components, which constitute the polymer film according to an embodiment, the content of the residual solvent, along with such various process conditions as drying conditions and thermal treatment conditions in the process for preparing the polymer film as described below.

Front Panel

The front panel according to an embodiment comprises a polymer film and a functional layer.

The front panel may be a front panel for a display.

The polymer film comprises a polymer resin selected from the group consisting of a polyamide-based resin and a polyimide-based resin.

The polymer film according to an embodiment has an $MOR_{0/9}$ according to the above Equation A of 2% or less.

The polymer film according to another embodiment has an $S_1$ of the above Formula (1) of 40% or less, an $S_2$ of the above Formula (2) of 55% or less, and an $S_3$ of the above Formula (3) of 80% or less.

The details on the polymer film are as described above.

The front panel may be advantageously applied to a display device.

The polymer film is excellent in folding characteristics and transparency and maintains excellent mechanical properties even after repeated elongation and shrinkage in the elastic region. The functional layer, let alone the polymer film, is excellent in folding characteristics. Thus, the front panel can be advantageously applied to a foldable display device or a flexible displace device.

Display Device

The display device according to an embodiment comprises a display unit; and a front panel disposed on the display unit, wherein the front panel comprises a polymer film.

In addition, the polymer film comprises a polymer resin selected from the group consisting of a polyamide-based resin and a polyimide-based resin.

The polymer film according to an embodiment has an $MOR_{0/9}$ according to the above Equation A of 2% or less.

The polymer film according to another embodiment has an $S_1$ of the above Formula (1) of 40% or less, an $S_2$ of the above Formula (2) of 55% or less, and an $S_3$ of the above Formula (3) of 80% or less.

The details on the polymer film and the front panel are as described above.

FIG. 1 is a cross-sectional view of a display device according to an embodiment.

Specifically, FIG. 1 illustrates a display device, which comprises a display unit (400) and a front panel (300) disposed on the display unit (400), wherein the front panel comprises a polymer film (100) having a first side (101) and a second side (102) and a functional layer (200), and an adhesive layer (500) is interposed between the display unit (400) and the front panel (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel displays an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the front panel (300). The adhesive layer may be an optically transparent adhesive layer, but it is not particularly limited.

The front panel (300) is disposed on the display unit (400). The front panel is located at the outermost position of the display device to thereby protect the display unit.

The front panel (300) may comprise a polymer film and a functional layer. The functional layer may be at least one selected from the group consisting of a hard coating, a reflectance reducing layer, an antifouling layer, and an antiglare layer. The functional layer may be coated on at least one side of the polymer film.

Process for Preparing a Polymer Film

An embodiment provides a process for preparing a polymer film.

The process for preparing a polymer film according to an embodiment comprises preparing a solution comprising a polymer resin selected from the group consisting of a polyamide-based resin and a polyimide-based resin in an organic solvent; charging the solution comprising the polymer resin into a tank; extruding and casting the polymer solution in the tank and then drying it to prepare a gel sheet; and thermally treating the gel sheet, wherein the highest temperature in the thermal treatment step of the gel sheet is 300° C. or higher. Specifically, the thermal treatment may be carried out until the content of the residual solvent contained in the film is 2,000 ppm or less.

The process for preparing a polymer film according to another embodiment comprises preparing a polyimide-based polymer solution in an organic solvent; transferring the polymer solution to a tank; casting the polymer solution in the tank onto a belt and then drying it to prepare a gel-sheet; thermally treating the gel-sheet while it is moved to prepare a cured film; cooling the cured film while it is moved; and winding the cooled cured film using a winder. Specifically, the ratio of the moving speed of the gel-sheet on the belt at the time of drying to the moving speed of the cured film at the time of winding may be 1:1.01 to 1:1.10.

Figure 2:
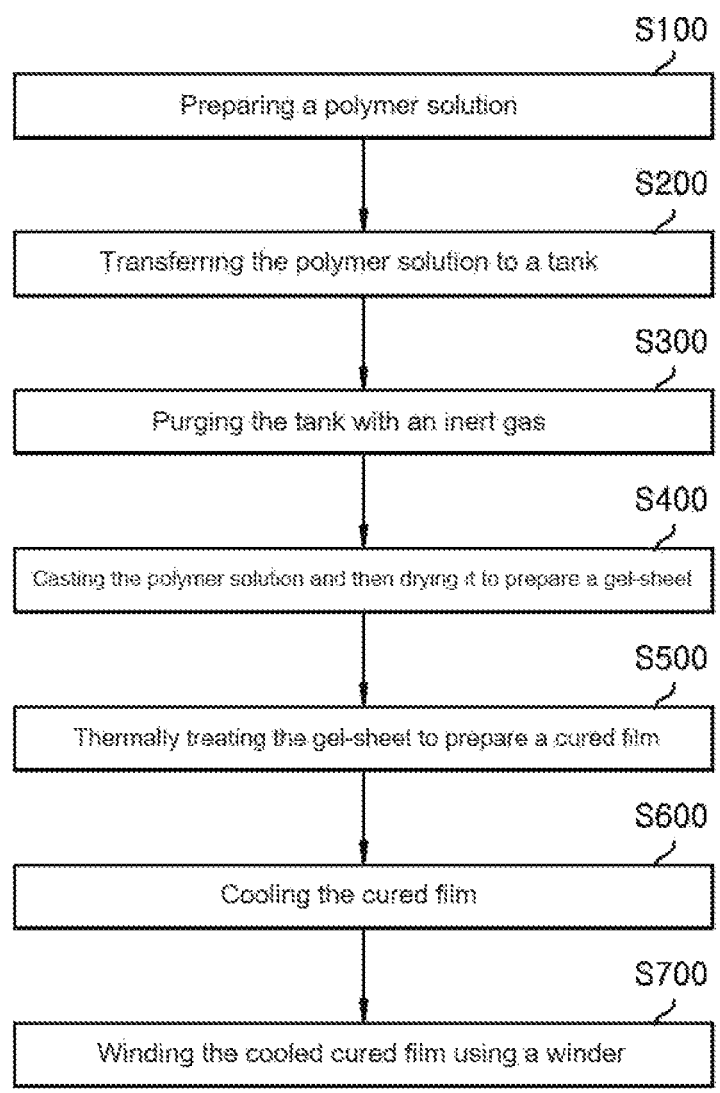
FIG. 2 is a schematic flow diagram of a process for preparing a polymer film according to an embodiment.

Referring to FIG. 2, the process for preparing a polymer film according to an embodiment comprises simultaneously or sequentially mixing a diamine compound, a dianhydride compound, and optionally a dicarbonyl compound in an organic solvent in a polymerization apparatus, and reacting the mixture to prepare a polymer solution (S100); transferring the polymer solution to a tank (S200); purging with an inert gas (S300); casting the polymer solution in the tank onto a belt and then drying it to prepare a gel-sheet (S400); thermally treating the gel-sheet while it is moved to prepare a cured film (S500); cooling the cured film while it is moved (S600); and winding the cooled cured film using a winder (S700).

The polymer film comprises a polymer resin, as a main component, selected from the group consisting of a polyamide-based resin and a polyimide-based resin.

In the process for preparing a polymer film, a polymer solution for preparing the polymer resin is prepared by simultaneously or sequentially mixing a diamine compound and a dicarbonyl compound, or a diamine compound, a dianhydride compound, and a dicarbonyl compound, in an organic solvent in a polymerization apparatus, and reacting the mixture (S100).

In an embodiment, the polymer solution may be prepared by simultaneously mixing and reacting a diamine compound, a dianhydride compound, and optionally a dicarbonyl compound in an organic solvent.

In another embodiment, the step of preparing the polymer solution may comprise mixing and reacting the diamine compound and the dianhydride compound in a solvent to produce a polyamic acid solution; and subjecting the polyamic acid solution to dehydration to produce a polyimide (PI) solution.

In still another embodiment, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide-based repeat unit.

In still another embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide-based repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

For example, the polymer contained in the polymer solution may comprise an imide repeat unit derived from the polymerization of the diamine compound and the dianhydride compound.

Alternatively, the polymer contained in the polymer solution may comprise an imide repeat unit derived from the polymerization of the diamine compound and the dianhydride compound and an amide repeat unit derived from the polymerization of the diamine compound and the dicarbonyl compound.

The content of solids contained in the polymer solution may be 10% by weight to 30% by weight. Alternatively, the content of solids contained in the polymer solution may be 15% by weight to 25% by weight, but it is not limited thereto.

If the content of solids contained in the polymer solution is within the above range, a polyamide-imide film can be effectively produced in the extrusion and casting steps. In addition, the polymer film thus prepared can maintain excellent modulus even after repeated elongation and shrinkage in the elastic region and has a clean appearance and transparency. Further, the polymer film thus prepared is hardly deformed when a certain level of load is continuously applied for a long period of time and is excellent in folding characteristics and optical properties in terms of the low yellow index and the like.

In an embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.5 molar equivalent, or 0.01 to 0.4 molar equivalent, based on 1 mole of the polyamic acid, but it is not limited thereto.

The further addition of the catalyst may expedite the reaction rate and enhance the chemical bonding force between the repeat unit structures or that within the repeat unit structures.

In another embodiment, the step of preparing the polymer solution may further comprise adjusting the viscosity of the polymer solution.

Specifically, the step of preparing the polymer solution may comprise (a) simultaneously or sequentially mixing and reacting a diamine compound, a dianhydride compound, and optionally a dicarbonyl compound in an organic solvent to prepare a first polymer solution; (b) measuring the viscosity of the first polymer solution and evaluating whether the target viscosity has been reached; and (c) if the viscosity of the first polymer solution does not reach the target viscosity, further adding the dianhydride compound or the dicarbonyl compound to prepare a second polymer solution having the target viscosity.

The target viscosity may be 100,000 cps to 500,000 cps at room temperature. Specifically, the target viscosity may be 100,000 cps to 400,000 cps, 100,000 cps to 350,000 cps, 100,000 cps to 300,000 cps, 150,000 cps to 300,000 cps, or 150,000 cps to 250,000 cps, but it is not limited thereto.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds are different from each other. For example, the stirring speed when the first polymer solution is prepared is faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7, but it is not limited thereto.

The pH of the polymer solution may be adjusted by adding a pH adjusting agent. The pH adjusting agent is not particularly limited and may include, for example, amine-based compounds such as alkoxyamine, alkylamine, and alkanolamine.

If the pH of the polymer solution is adjusted to the above range, it is possible to prevent the damage to the equipment in the subsequent process, to prevent the occurrence of defects in the film produced from the polymer solution, and to achieve the desired optical properties and mechanical properties in terms of yellow index and modulus.

The pH adjusting agent may be employed in an amount of 0.1% by mole to 10% by mole based on the total number of moles of monomers in the polymer solution.

In another embodiment, the step of preparing the polymer solution may further comprise purging with an inert gas. The step of purging with an inert gas may remove moisture, reduce impurities, increase the reaction yield, and impart excellent surface appearance and mechanical properties to the film finally produced.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The molar ratio of the dianhydride compound and the dicarbonyl compound used to prepare the polymer solution may be 0:100 to 50:50, 0:100 to 40:60, or 0:100 to 35:65, but it is not limited thereto.

Alternatively, the molar ratio of the dianhydride compound and the dicarbonyl compound used to prepare the polymer solution may be 15:85 to 100:0, 15:85 to 85:15, 15:85 to 80:20, 15:85 to 75:25, 15:85 to 70:30, or 15:85 to 60:40, but it is not limited thereto.

If the dianhydride compound and the dicarbonyl compound are employed at the above molar ratio, it is advantageous for achieving the desired mechanical and optical properties of the polyamide-imide film prepared from the polymer solution.

In addition, if the dianhydride compound and the dicarbonyl compound are employed at the above molar ratio, it is advantageous for achieving a desired level of such mechanical properties as deformation characteristics under a load, flexural resistance, and modulus, and such optical properties as haze and transmittance of the polymer film prepared from the polymer solution.

The details on the diamine compound, the dianhydride compound, and the dicarbonyl compound are as described above.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

Next, after the step of preparing the polymer solution, the polymer solution is transferred to a tank (S200).

Specifically, the polymer solution comprises a polymer resin, and the polymer solution is charged to a tank.

Figure 3:
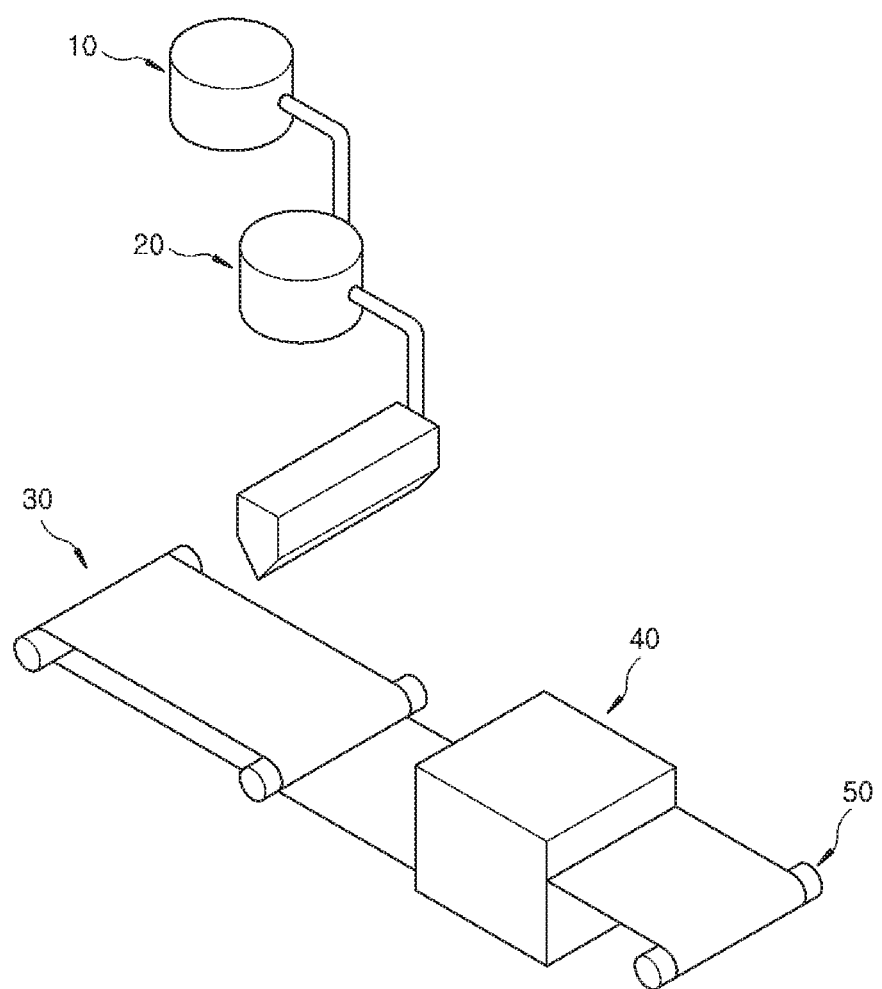
FIG. 3 schematically illustrates process facilities for preparing a polymer film according to an embodiment.

FIG. 3 schematically illustrates process facilities for preparing the polymer film according to an embodiment. Referring to FIG. 3, the polymer solution as described above is prepared in a polymerization apparatus (10), and the polymer solution thus produced is transferred to, and stored in, a tank (20).

Here, once the polymer solution has been prepared, the step of transferring the polymer solution to the tank is carried out without any additional steps. Specifically, the polymer solution prepared in the polymerization apparatus is transferred to, and stored in, the tank without any separate precipitation and redissolution steps for removing impurities. In the conventional process, in order to remove impurities such as hydrochloric acid (HCl) generated during the preparation of a polymer solution, the polymer solution thus prepared is purified through a separate step to remove the impurities, and the purified polymer solution is then redissolved in a solvent. In this case, however, there has been a problem that the loss of the active ingredient increases in the step of removing the impurities, resulting in decreases in the yield.

Accordingly, the preparation process according to an embodiment ultimately minimizes the amount of impurities generated in the step of preparing the polymer solution or properly controls the impurities in the subsequent steps, even if a certain amount of impurities is present, so as not to deteriorate the physical properties of the final film. Thus, the process has an advantage in that a film is produced without separate precipitation or redissolution steps.

The tank (20) is a place for storing the polymer solution before forming it into a film, and its internal temperature may be −20° C. to 20° C.

Specifically, the internal temperature may be −20° C. to 10° C., −20° C. to 5° C., −20° C. to 0° C., or 0° C. to 10° C., but it is not limited thereto.

If the internal temperature of the tank (20) is controlled to the above range, it is possible to prevent the polymer solution from deteriorating during storage, and it is possible to lower the moisture content to thereby prevent defects of the film produced therefrom.

The process for preparing a polymer film may further comprise carrying out vacuum degassing of the polymer solution transferred to the tank (20).

The vacuum degassing may be carried out for 30 minutes to 3 hours after depressurizing the internal pressure of the tank to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the process for preparing a polymer film may further comprise purging the polymer solution transferred to the tank (20) with an inert gas (S300).

Specifically, the purging is carried out by purging the tank with an inert gas at an internal pressure of 1 atm to 2 atm. The nitrogen purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The step of vacuum degassing and the step of purging the tank with an inert gas are performed in a separate step, respectively.

For example, the step of vacuum degassing may be carried out, followed by the step of purging the tank with an inert gas, but it is not limited thereto.

The step of vacuum degassing and/or the step of purging the tank with an inert gas may improve the physical properties of the surface of the polymer film thus produced.

Thereafter, the process may further comprise storing the polymer solution in the tank (20) for 1 hour to 360 hours. Here, the temperature inside the tank may be kept at −20° C. to 20° C.

The process for preparing a polymer film may further comprise extruding and casting the polymer solution in the tank and then drying it to prepare a gel-sheet (S400).

The polymer solution may be cast onto a casting body such as a casting roll or a casting belt.

Referring to FIG. 3, according to an embodiment, the polymer solution may be applied onto a casting belt (30) as a casting body, and it is dried while it is moved to be made into a sheet in the form of a gel.

When the polymer solution is injected onto the belt (30), the injection rate may be 300 g/min to 700 g/min. If the injection rate of the polymer solution satisfies the above range, the gel-sheet can be uniformly formed to an appropriate thickness.

In addition, the casting thickness of the polymer solution may be 200 μm to 700 μm. If the polymer solution is cast to a thickness within the above range, the final film produced after the drying and thermal treatment may have an appropriate and uniform thickness.

As described above, the viscosity of the polymer solution at room temperature may be 100,000 cps to 500,000 cps, for example, 100,000 cps to 400,000 cps, 100,000 cps to 350,000 cps, 150,000 cps to 350,000 cps, or 150,000 cps to 250,000 cps. If the viscosity satisfies the above range, the polymer solution can be cast onto a belt in a uniform thickness without defects.

The polymer solution is cast and then dried at a temperature of 60° C. to 150° C. for 5 minutes to 60 minutes to prepare a gel-sheet. Specifically, the drying may be carried out with hot air at 60° C. to 120° C. for 10 minutes to 50 minutes. More specifically, the drying may be carried out with hot air at 60° C. to 100° C. for 20 minutes to 40 minutes. For example, the drying may be carried out with hot air at 80° C. for 30 minutes.

The solvent of the polymer solution is partially or totally volatilized during the drying to prepare the gel-sheet.

The moving speed of the gel-sheet on the casting body at the time of drying may be 0.1 m/min to 15 m/min, for example, 0.5 m/min to 10 m/min, but it is not limited thereto.

The process for preparing a polymer film comprises thermally treating the gel-sheet while it is moved to prepare a cured film (S500).

Referring to FIG. 3, the thermal treatment of the gel-sheet may be carried out by passing it through a thermosetting device (40).

The thermal treatment of the gel-sheet is carried out in a temperature range of 80° C. to 500° C. for 5 minutes to 180 minutes. Specifically, the thermal treatment of the gel-sheet may be carried out in a temperature range of 80° C. to 500° C. at a temperature elevation rate of 2° C./min to 80° C./min for 5 minutes to 150 minutes. More specifically, the thermal treatment of the gel-sheet may be carried out in a temperature range of 80° C. to 400° C. at a temperature elevation rate of 2° C./min to 80° C./min. For example, the thermal treatment of the gel-sheet may be carried out in a temperature range of 80° C. to 380° C. at a temperature elevation rate of 2° C./min to 80° C./min. More specifically, the thermal treatment of the gel-sheet may be carried out in a temperature range of 80° C. to 300° C. at a temperature elevation rate of 2° C./min to 80° C./min.

In addition, the highest temperature in the thermal treatment of the gel-sheet is 300° C. or higher. Specifically, the highest temperature may be 320° C. or higher, or 350° C. or higher, but it is not limited thereto.

If the highest temperature in the thermal treatment of the gel-sheet is lower than the above range, the modulus of the film thus prepared rapidly decreases as elongation and shrinkage are repeated, whereby it is unsuitable for application to a foldable display or a flexible display.

According to an embodiment, the gel-sheet may be treated with hot air.

If the thermal treatment is carried out with hot air, the heat may be uniformly supplied. If the heat is not uniformly supplied, satisfactory mechanical properties cannot be achieved. In particular, a satisfactory surface roughness cannot be achieved, which may raise or lower the surface tension too much.

The thermal treatment under these conditions may cure the gel-sheet to have an appropriate surface hardness and modulus, and the cured film thus prepared may have excellent folding characteristics, optical properties, and mechanical properties in terms of little deformation even under a certain level of load.

According to an embodiment, the thermal treatment of the gel-sheet may be carried out in one or more steps.

Specifically, the thermal treatment may be carried out until the content of the residual solvent contained in the film is 2,000 ppm or less.

For example, if the content of the residual solvent exceeds 2,000 ppm upon the thermal treatment of the gel-sheet under the above conditions, the thermal treatment may be carried out one or more times.

In addition, in the thermal treatment step, the gel-sheet may be stretched by 1.01 times to 1.05 times in the MD direction. The gel-sheet may be stretched by 1.01 times to 1.05 times in the MD direction between the first thermal treatment step and the second thermal treatment step.

In the thermal treatment step, the gel-sheet may be stretched by 1.01 times to 1.05 times in the TD direction. In the second thermal treatment step, the gel-sheet may be stretched by 1.01 times to 1.05 times in the TD direction.

The gel-sheet may be simultaneously stretched by 1.01 times to 1.05 times in the MD direction and in the TD direction. The gel-sheet may be sequentially stretched by 1.01 times to 1.05 times in the MD direction and then by 1.01 times to 1.05 times in the TD direction.

The thermal treatment under these conditions may cure the gel-sheet to have an appropriate surface hardness and modulus, and the cured film thus prepared may have excellent folding characteristics, optical properties, and mechanical properties even after repeated elongation and shrinkage several times.

The process for preparing a polymer film comprises cooling the cured film while it is moved (S600).

Referring to FIG. 3, the cooling of the cured film is carried out after it has been passed through the thermosetting device (40). It may be carried out by using a separate cooling chamber (not shown) or by forming an appropriate temperature atmosphere without a separate cooling chamber.

The step of cooling the cured film while it is moved may comprise a first temperature lowering step of reducing the temperature at a rate of 100° C./min to 1,000° C./min and a second temperature lowering step of reducing the temperature at a rate of 40° C./min to 400° C./min.

In such event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried in such a multistage manner, it is possible to have the physical properties of the cured film further stabilized and to maintain the optical properties and mechanical properties of the film achieved during the curing step more stably for a long period of time.

The moving speed of the gel-sheet and the moving speed of the cured film are the same.

The process for preparing a polymer film comprises winding the cooled cured film using a winder (S700).

Referring to FIG. 3, the cooled cured film may be wound using a roll-shaped winder (50).

In such event, the ratio of the moving speed of the gel-sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.10 to 1:1.05, but it is not limited thereto.

If the ratio of the moving speeds satisfies the above range, the film is stretched in the MD direction. For example, when the ratio of the moving speeds is 1:1.01, the film may be stretched by 1.01 times in the MD direction, but it is not limited thereto. If the ratio of the moving speeds satisfies the above range, the film is stretched in the MD direction, which causes crystallization in the film through orientation to achieve the desired physical properties.

If the ratio of the moving speeds is outside the above range, the mechanical properties of the cured film may be impaired, and the flexibility and elastic properties may be deteriorated. Specifically, if the ratio of the moving speeds exceeds the above range, the film may be broken or its flexural characteristics may be deteriorated. In the polymer film according to an embodiment, the ratio of the moving speeds is particularly important in order to satisfy the above-described folding characteristics and deformation characteristics under a load.

In the process for preparing a polymer film, the thickness variation (%) according to the following Equation 1 may be 3% to 30%. Specifically, the thickness variation (%) may be 5% to 20%, but it is not limited thereto.

$$\text{Thickness variation (\%)}=\{(M1-M2)/M2\}\times 100 \quad \text{[Equation 1]}$$

In the above Equation 1, M1 is the thickness (μm) of the gel-sheet, and M2 is the thickness (μm) of the cooled cured film at the time of winding.

The polymer film prepared by the preparation process as described above is excellent in antiblocking characteristics, optical properties, and mechanical properties. The polymer film may be applicable to various uses that require durability and transparency.

For example, the polymer film may be applied to solar cells, semiconductor devices, sensors, and the like, as well as display devices.

The details on the polymer film prepared by the process for preparing a polymer film are as described above.

Hereinafter, the above description will be described in detail by referring to examples. However, these examples are set forth to illustrate the present invention, and the scope of the present invention is not limited thereto.

Example and Evaluation Example

Example 1a

A 1,000-liter glass reactor equipped with a temperature-controllable double jacket was charged with 250 kg of dimethylacetamide (DMAc) as an organic solvent at 20° C. under a nitrogen atmosphere. Then, 40 kg of 2,2'-bis(trifluoromethyl)-4,4'-diaminobiphenyl (TFMB) as an aromatic diamine was slowly added thereto and dissolved.

Subsequently, while 2,2'-bis(3,4-dicarboxyphenyl)hexafluoropropane dianhydride (6-FDA) as an aromatic dianhydride was slowly added thereto, the mixture was stirred for 1 hour. Then, isophthaloyl chloride (IPC) as a first dicarbonyl compound was added, followed by stirring the mixture for 1 hour. And terephthaloyl chloride (TPC) as a second dicarbonyl compound was added in an amount of 94% based on the introduced molar amount, followed by stirring the mixture for 1 hour, thereby preparing a first polymer solution.

The viscosity of the first polymer solution thus prepared was measured. If the measured viscosity did not reach the target viscosity, a TPC solution in a DMAc organic solvent at a concentration of 10% by weight was prepared, and 1 ml of the TPC solution was added to the first polymer solution, followed by stirring for 30 minutes. This procedure was repeated until the viscosity became 200,000 cps, thereby preparing a second polymer solution.

Subsequently, the second polymer solution was cast onto a stainless steel belt and then dried with hot air at 80° C. for 30 minutes, thereby producing a gel-sheet. Then, while the gel-sheet was moved, it was heated in a temperature range of 80° C. to 380° C. at a temperature elevation rate of 2° C./min to 80° C./min, followed by thermal treatment at the highest temperature for 25 minutes. Thereafter, a first temperature lowering step was carried out by reducing the temperature at a rate of about 800° C./min, followed by a second temperature lowering step by reducing the temperature at a rate of about 100° C./min, thereby obtaining a base film, which was wound using a winder.

As to the contents of the diamine compound (TFMB), dianhydride compounds (6FDA, IPC, and TPC), and the dicarbonyl compounds (IPC and TPC), the number of moles of the dianhydride compound and the dicarbonyl compounds based on 100 moles of the diamine compound is shown in Table 1.

Examples 2a to 6a and Comparative Examples 1a and 2a

Films were prepared in the same manner as in Example 1a, except that the types and contents of the respective reactants, the highest temperature in the thermal treatment, and the like were changed as shown in Table 1 below.

The films prepared in Examples 1a to 6a and Comparative Examples 1a and 2a were each measured and evaluated for the following properties. The results are shown in Table 1 below.

Evaluation Example 1a: Measurement of Film Thickness

The thickness was measured at 5 points in the transverse direction using a digital micrometer 547-401 manufactured by Mitutoyo Corporation. Their average value was adopted as the thickness.

Evaluation Example 2a: Measurement of a Residual Solvent in a Film 0.02 g of a sample was taken and purged for 1 hour at 30° C. using a Purge & Trap-GC/MSD device. The outgassing was collected at 300° C. for 10 minutes, which was quantitatively and qualitatively analyzed to measure the amount of the residual solvent.

Evaluation Example 3a: Measurement of Modulus

A sample was cut out by at least 10 cm in the MD direction and by 10 cm in the TD direction, which was fixed by the clips disposed at intervals of 10 cm in a universal testing machine UTM 5566A of Instron. A stress-strain curve was obtained until the elongation was 2% while it was stretched at a rate of 12.5 mm/min at room temperature. The slope of the load with respect to the initial strain on the stress-strain curve was taken as the modulus (GPa).

The measurements of modulus as described above were repeated. Specifically, the initial modulus is MO0, the modulus measured after one time of elongation/shrinkage is MO1, the modulus measured after two times of elongation/shrinkage is MO2, the modulus measured after three times of elongation/shrinkage is MO3, the modulus measured after four times of elongation/shrinkage is MO4, the modulus measured after five times of elongation/shrinkage is MO5, the modulus measured after six times of elongation/shrinkage is MO6, the modulus measured after seven times of elongation/shrinkage is MO7, the modulus measured after eight times of elongation/shrinkage is MO8, and the modulus measured after nine times of elongation/shrinkage is MO9. The values of MO0 to MO9 are shown in Table 1.

The standard deviation in modulus with respect to the repeated elongation/shrinkage was calculated based on a total of 10 values of MO0 to MO9, which is shown in Table 1.

Evaluation Example 4a: Measurement of Transmittance and Haze

The transmittance at 550 nm was measured using a haze meter NDH-5000W manufactured by Nippon Denshoku Kogyo.

Evaluation Example 5a: Measurement of Yellow Index

The yellow index (YI) was measured with a spectrophotometer (UltraScan PRO, Hunter Associates Laboratory) using a CIE colorimetric system.

TABLE 1

| | | Ex. 1a | Ex. 2a | Ex. 3a | Ex. 4a | Ex. 5a | Ex. 6a | C. Ex. 1a | C. Ex. 2a |
|---|---|---|---|---|---|---|---|---|---|
| Composition | Diamine | TFMB 100 | TFMB 100 | TFMB 100 | TFMB 100 | TFMB 100 | TFMB 100 | TFMB 100 | TFMB 100 |
| | Dianhydride | 6FDA 5 | | 6FDA 25 | 6FDA 25 BPDA 10 | 6FDA 25 CBDA 10 | 6FDA 5 | 6FDA 5 | 6FDA 25 BPDA 10 |
| | Dicarbonyl compound | IPC 30 TPC 65 | IPC 30 TPC 70 | IPC 15 TPC 60 | TPC 65 | TPC 65 | IPC 30 TPC 65 | IPC 30 TPC 65 | TPC 65 |
| | Imide:amide | 5:95 | 0:100 | 25:75 | 35:65 | 35:65 | 5:95 | 5:95 | 35:65 |
| Residual solvent in a film (ppm) | | 1221 | 1186 | 1253 | 1120 | 1109 | 813 | 2209 | 2119 |
| IRS value | | 66.05 | 59.3 | 87.65 | 91 | 90.45 | 45.65 | 115.45 | 140.95 |
| MO0 (GPa) | | 7.52 | 7.78 | 6.97 | 6.85 | 7.47 | 7.66 | 7.61 | 6.88 |
| MO9 (GPa) | | 7.49 | 7.7 | 6.98 | 6.91 | 7.52 | 7.61 | 7.42 | 6.64 |
| Standard deviation in modulus (GPa) | | 0.03 | 0.03 | 0.02 | 0.03 | 0.03 | 0.02 | 0.07 | 0.08 |
| $dMO_{0/9}$ (GPa) | | 0.03 | 0.08 | 0.01 | 0.06 | 0.05 | 0.05 | 0.19 | 0.24 |
| $MOR_{0/9}$ (%) | | 0.40 | 1.03 | 0.14 | 0.88 | 0.67 | 0.65 | 2.50 | 3.49 |
| MPA (%) | | 0.42 | 1.03 | 0.19 | 1.35 | 1.03 | 0.68 | 2.63 | 5.37 |
| Highest temp. in thermal treatment (° C.) | | 350 | 350 | 350 | 350 | 350 | 380 | 250 | 250 |
| Thickness (μm) | | 50 | 50 | 50 | 50 | 50 | 50 | 50 | 50 |
| Transmittance (%) | | 89 | 89.1 | 89 | 89 | 89 | 89 | 89 | 89 |
| Haze (%) | | 0.4 | 0.4 | 0.4 | 0.4 | 0.4 | 0.4 | 0.4 | 0.4 |
| Yellow index | | 2.4 | 2.9 | 2.4 | 2.6 | 2.6 | 2.6 | 2.4 | 2.7 |

As can be seen from Table 1 above, the polymer films of Examples 1a to 6a had a standard deviation in modulus of 0.06 or less, indicating that the change in modulus even after repeated elongation and shrinkage was small.

Further, the polymer films of Examples 1a to 6a had an $MOR_{0/9}$ of 2% or less, indicating that the change in modulus even after repeated elongation and shrinkage in the elastic region was small. Thus, they are suitable for application to a foldable display or a flexible display, which has recently been in the spotlight.

In contrast, since the films of Comparative Examples 1a and 2a had a high $MOR_{0/9}$ of 2.5% or more, when the film is applied to a cover window for a display device, it is not balanced with other layers, resulting in cracks, which is defective in terms of the appearance stability. In particular, the films of Comparative Examples 1a and 2a are unsuitable for application to a foldable display device or a flexible display device in which the deformation of the film is repeated.

Example 1b

A 1-liter glass reactor equipped with a temperature-controllable double jacket was charged with 563.3 g of dimethylacetamide (DMAc) as an organic solvent at 20° C. under a nitrogen atmosphere. Then, 2,2'-bis(trifluoromethyl)-4,4'-diaminobiphenyl (TFMB) and 4,4'-oxydianiline (ODA) were slowly added thereto for dissolution thereof. Subsequently, 2,2'-bis(3,4-dicarboxyphenyl)hexafluoropropane dianhydride (6-FDA) was slowly added thereto, and the mixture was stirred for 2 hours. Then, isophthaloyl chloride (IPC) was added, followed by stirring for 2 hours. And terephthaloyl chloride (TPC) was added, followed by stirring for 3 hours, thereby preparing a polymer solution.

The polymer solution thus obtained was coated onto a glass plate and then dried with hot air at 80° C. for 30 minutes. Thereafter, the dried gel-sheet was fixed to a pin frame while it was stretched by 1.01 times in a first direction and stretched by 1.03 times in a second direction perpendicular to the first direction. Thereafter, while the dried gel-sheet was fixed to the pin frame, it was cured in an atmosphere heated at a rate of 2° C./min in a temperature range of 80° C. to 300° C. Thereafter, it was cooled to obtain a cured film having a thickness of 50 μm. Then, the cooled cured film was wound up by a winder.

As to the contents of TFMB, ODA, 6-FDA, IPC, and TPC, the number of moles of the dianhydride compound and the dicarbonyl compounds based on 100 moles of the diamine compounds (TFMB and ODA) is shown in Table 2.

Examples 2b to 4b and Comparative Examples 1b to 4b

Films were prepared in the same manner as in Example 1b, except that the types and contents of the respective reactants, the stretching ratio, and the like were changed as shown in Table 2 below.

The films prepared in Examples 1b to 4b and Comparative Examples 1b to 4b were each measured and evaluated for the following properties. The results are shown in Table 2 below.

Evaluation Example 1b: Measurement of $L_1$ to $L_3$

Step 1: A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. The tensile strength was obtained until the sample was fractured while it was stretched at a rate of 50 mm/min at room temperature. The load (or tensile load) applied to each strain (tensile ratio) of a sample was calculated from the above. Specifically, the load at the time the length is increased by 1% relative to the initial length is $W_1$, the load at the time the length is increased by 2% is $W_2$, and the load at the time the length is increased by 3% is $W_3$.

Step 2: When the load $W_1$ measured in step 1 is applied for 1 hour in the longitudinal direction of the film, the ratio of the increased length to the initial length is $L_1$%; when the load $W_2$ is applied for 1 hour in the longitudinal direction of the film, the ratio of the increased length to the initial length is $L_2$%; and when the load $W_3$ is applied for 1 hour in the longitudinal direction of the film, the ratio of the increased length to the initial length is $L_3$%.

Evaluation Example 2b: Measurement of Flexural Resistance

The film having a thickness of 50 μm was subjected to repeated folding to have a radius of curvature of 2 mm and then unfolded (the number of folding counts one upon folding and unfolding). If it was not fractured upon repeated folding of 200,000 times, it was indicated as O. If fractured before repeated folding of 200,000 times, it was indicated as x. The number of folding times was counted using the U-shape folding equipment of YUASA.

Evaluation Example 3b: Measurement of Modulus

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The slope of the load with respect to the initial strain on the stress-strain curve was taken as the modulus (GPa).

Evaluation Example 4b: Measurement of Tensile Strength

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The maximum power exerted at the time of fracture in the stress-strain curve was defined as the tensile strength (kgf/$mm^2$).

Evaluation Example 5b: Measurement of Elongation

A sample was cut out by at least 5 cm in the direction perpendicular to the main shrinkage direction of the film and by 10 cm in the main shrinkage direction. It was fixed by the clips disposed at intervals of 5 cm in a universal testing machine UTM 5566A of Instron. A stress-strain curve was obtained until the sample was fractured while it was stretched at a rate of 5 mm/min at room temperature. The maximum ratio of elongation at the time of fracture in the stress-strain curve was defined as the elongation (%).

Evaluation Example 6b: Measurement of Yellow Index

The yellow index (YI) was measured with a spectrophotometer (UltraScan PRO, Hunter Associates Laboratory) using a CIE colorimetric system.

Evaluation Example 7b: Measurement of Transmittance

The transmittance at 550 nm was measured using a haze meter NDH-5000W manufactured by Nippon Denshoku Kogyo.

TABLE 2

| | | Ex. 1b | Ex. 2b | Ex. 3b | Ex. 4b | C. Ex. 1b | C. Ex. 2b | C. Ex. 3b | C. Ex. 4b |
|---|---|---|---|---|---|---|---|---|---|
| Composition | Diamine | TFMB 55 ODA 45 | TFMB 100 | TFMB 100 | TFMB 100 | TFMB 40 ODA 60 | TFMB 100 | TFMB 40 ODA 60 | TFMB 40 ODA 60 |
| | Dianhydride | 6FDA 15 | 6FDA 10 BPDA 5 | 6FDA 35 CBDA 25 | 6FDA 100 | 6FDA 10 | 6FDA 40 BPDA 50 | 6FDA 10 | 6FDA 50 |
| | Dicarbonyl compound | IPC 25 TPC 60 | TPC 85 | TPC 40 | — | IPC 25 TPC 65 | TPC 10 | IPC 25 TPC 65 | TPC 50 |
| | Molar ratio of imide:amide | 15:85 | 15:85 | 60:40 | 100:0 | 10:90 | 90:10 | 10:90 | 50:50 |
| Moiety A + Moiety B (% by mole) | | 35 | 57.5 | 67.5 | 100 | 25 | 95 | 25 | 20 |
| $L_1$ (%) | | 1.18 | 1.32 | 1.12 | 1.12 | 1.44 | 1.27 | 1.46 | 1.41 |
| $S_1$ (%) | | 18 | 32 | 12 | 12 | 44 | 27 | 46 | 41 |
| $L_2$ (%) | | 2.31 | 2.82 | 2.76 | 2.3 | 5.96 | 2.67 | 2.71 | 4.52 |
| $S_2$ (%) | | 15.5 | 41 | 38 | 15 | 198 | 33.5 | 35.5 | 126 |
| $L_3$ (%) | | 5.15 | 4.87 | 5.34 | 5.3 | 9.25 | 5.41 | 5.91 | 8.21 |
| $S_3$ (%) | | 71.67 | 62.33 | 78 | 76.67 | 208.33 | 80.33 | 97 | 173.67 |
| Stretching ratio (MD direction; times) | | 1.01 | 1.05 | 1.1 | 1.05 | 1.02 | 1.15 | 1.2 | 1.1 |
| Flexural resistance | | ○ | ○ | ○ | x | ○ | x | x | x |
| Modulus | | 5.5 | 5.7 | 5.9 | 3.1 | 6.1 | 5.1 | 5.9 | 5.5 |
| Tensile strength | | 21 | 21.5 | 24 | 23 | 25 | 19.5 | 25 | 22 |
| Elongation | | 19 | 18 | 20 | 13 | 23 | 25 | 27 | 21 |
| Yellow index | | 2.9 | 2.3 | 2.1 | 2.5 | 3.7 | 3.3 | 3.5 | 3.2 |
| Transmittance | | 88.9 | 89.3 | 89.5 | 89.1 | 88.7 | 88.5 | 88.2 | 88.9 |

As can be seen from Table 2 above, the polymer films of Examples 1b to 4b were hardly deformed when a certain level of load was continuously applied, so that it is possible to provide a uniform screen state when the film is applied to a display device.

In addition, when the polymer films of Examples 1b to 3b were subjected to repeated folding to a radius of curvature of 2 mm, the number of folding before fracture was 200,000 or more. Thus, they are suitable for application to a foldable display, a flexible display, a rollable display, and the like.

Further, the polymer films of Examples 1b to 4b had high mechanical properties such as modulus, tensile strength, and elongation and maintained excellent optical properties such as yellow index and transmittance.

REFERENCE NUMERALS OF THE DRAWINGS

10: polymerization apparatus
20: tank
30: belt
40: thermosetting device
50: winder
100: polymer film
101: first side
102: second side
200: functional layer
300: front panel
400: display unit
500: adhesive layer

The invention claimed is:

1. A polymer film for a display, which comprises a polymer resin selected from the group consisting of a polyamide-based resin and a polyimide-based resin, and which has an $MOR_{0/9}$ of the following Equation A of 2% or less, wherein a content of a residual solvent in the polymer film is 2,000 ppm or less:

$$MOR_{0/9}(\%) = \frac{|MO0 - MO9|}{MO9} \times 100 \quad [\text{Equation A}]$$

in Equation A, MO0 refers to the initial modulus, and MO9 refers to the modulus measured after elongation and shrinkage are repeated 9 times wherein each elongation is 2%, wherein the polymer resin comprises an imide-based repeat unit, an amide-based repeat unit or combinations thereof, with the proviso that a molar ratio of the imide-based repeat unit and the amide-based repeat unit ranges from 0:100 to 35:65, wherein the polymer film for a display has a $dMO_{0/9}$ of the following Equation B of 0.18 GPa or less:

$$dMO_{0/9}(\text{GPa}) = |MO0 - MO9| \quad [\text{Equation B}]$$

in Equation B, MO0 refers to the initial modulus, and MO9 refers to the modulus measured after elongation and shrinkage are repeated 9 times wherein each elongation is 2%, and wherein the polymer film for a display has an IRS of the following Equation C of 100 or less:

$$IRS = \frac{IM}{1 \text{ mol}} + \frac{RS}{20 \text{ ppm}} \qquad \text{[Equation C]}$$

in Equation C, IM stands for the number of moles of the imide-based repeat unit when the total number of moles of the imide-based repeat unit and the amide-based repeat unit in the film is 100; and RS stands for the content (ppm) of the residual solvent in the film.

2. The polymer film for a display of claim 1, wherein when the initial modulus is MO0, and the modulus measured after elongation and shrinkage are repeated n times wherein each elongation is 2% is MOn, the standard deviation in modulus calculated based on a total of 10 values, MO0 to MO9, is 0.06 GPa or less.

3. The polymer film for a display of claim 1, which has an initial modulus (MO0) of 5.0 GPa or more, and a modulus (MO9) of 5 GPa or more when measured after elongation and shrinkage are repeated 9 times wherein each elongation is 2%.

4. The polymer film for a display of claim 1, wherein the polymer resin comprises an imide-based repeat unit and an amide-based repeat unit, and the polymer film has an MPA of the following Equation D of 2% or less:

$$MPA\ (\%) = MOR_{0/9}/AM \qquad \text{[Equation D]}$$

in Equation D, AM stands for the number of moles of the amide-based repeat unit when the total number of moles of the imide-based repeat unit and the amide-based repeat unit in the film is 1.

5. The polymer film for a display of claim 1, which has a transmittance of 80% or more, a haze of 1% or less, and a yellow index of 3 or less.

6. The polymer film for a display of claim 1, which has an $S_1$ of the following Equation (1) of 40% or less, an $S_2$ of the following Equation (2) of 55% or less, and an $S_3$ of the following Equation (3) of 80% or less:

$$S_1(\%) = (L_1\% - 1\%) \times 100 \qquad \text{[Equation (1)]}$$

$$S_2(\%) = \{(L_2\% - 2\%)/2\} \times 100 \qquad \text{[Equation (2)]}$$

$$S_3(\%) = \{(L_3\% - 3\%)/3\} \times 100 \qquad \text{[Equation (3)]}$$

in Equations (1) to (3), when the film is elongated, and when the load at the time the length is increased by 1% relative to the initial length is $W_1$, the load at the time the length is increased by 2% is $W_2$, and the load at the time the length is increased by 3% is $W_3$, the ratio of the increased length to the initial length is Li % when the load Wi is applied for 1 hour in the longitudinal direction of the film, the ratio of the increased length to the initial length is $L_2\%$ when the load $W_2$ is applied for 1 hour in the longitudinal direction of the film, and the ratio of the increased length to the initial length is $L_3\%$ when the load $W_3$ is applied for 1 hour in the longitudinal direction of the film.

7. A process for preparing the polymer film of claim 1, which comprises:

preparing a solution comprising a polymer resin selected from the group consisting of a polyamide-based resin and a polyimide-based resin in an organic solvent;

charging the solution comprising the polymer resin into a tank;

extruding and casting the polymer solution in the tank and then drying it to prepare a gel sheet; and thermally treating the gel sheet, wherein the highest temperature in the thermal treatment of the gel-sheet is 300° C. or higher.

8. The process of claim 7 for preparing the polymer film, wherein the thermal treatment is carried out until the content of the residual solvent contained in the film is 2,000 ppm or less.

* * * * *